United States Patent [19]

Huber et al.

[11] 3,879,134

[45] Apr. 22, 1975

[54] OPTICAL ROTOR FOR COLORIMETRIC ANALYSIS

[75] Inventors: Kenneth C. Huber; Charles F. Bino, both of Greensboro, N.C.; Roland Lee Connelly, Augusta, Ga.

[73] Assignee: Burlington Industries, Inc., Greensboro, N.C.

[22] Filed: Apr. 30, 1971

[21] Appl. No.: 139,168

[52] U.S. Cl. .................. 356/174; 350/7; 356/173
[51] Int. Cl. ..................... G02b 17/00; G01j 3/46
[58] Field of Search ............... 350/7, 173; 356/174

[56] References Cited
UNITED STATES PATENTS
| | | | |
|---|---|---|---|
| 2,054,195 | 9/1936 | Forrest et al. | 356/174 |
| 2,942,514 | 6/1960 | Brandon | 350/7 |
| 2,953,963 | 9/1960 | Bolkley et al. | 356/174 |

OTHER PUBLICATIONS
Matthews, Jr. American Dyestuff Reporter, Vol. 57, July 29, 1968, pp. 30-36.

*Primary Examiner*—Ronald L. Wibert
*Assistant Examiner*—R. J. Webster
*Attorney, Agent, or Firm*—Cushman, Darby & Cushman

[57] ABSTRACT

An optical rotor and a method for colorimetrically measuring material having an irregular or multicolored surface wherein an image of the surface is directed onto the rotor as it is rotated at a high speed in order to produce a continuously rotating image which appears to have a uniform color. In one embodiment, the optical rotor includes two pyramid-shaped mirrors which are mounted with their bases mated. The pyramid-shaped mirrors are surrounded by four concave spherical mirrors which define two apertures so that light beams of an image which are directed into one of the apertures strike the sides of one of the pyramid-shaped mirrors at an angle which is a function of the angular position of the pyramid-shaped mirrors about an axis which passes through the peaks and bases of both. Thus, the angular position of the image which appears at the other aperture is a function of the angular position of the two pyramid-shaped mirrors and by rotating the two pyramid-shaped mirrors, a rotating image can be produced which appears to have a uniform color. In the other embodiment, two prisms are disposed in a housing defining opposing apertures so that the angle of incidence of the light beams of an image onto a surface of one of the prisms varies as a function of the angular position of the prism so that a rotating image can be produced at the other aperture by rotating the two prisms.

5 Claims, 5 Drawing Figures

INVENTORS
KENNETH C. HUBER
CHARLES F. BINO
ROLAND CONNELLY

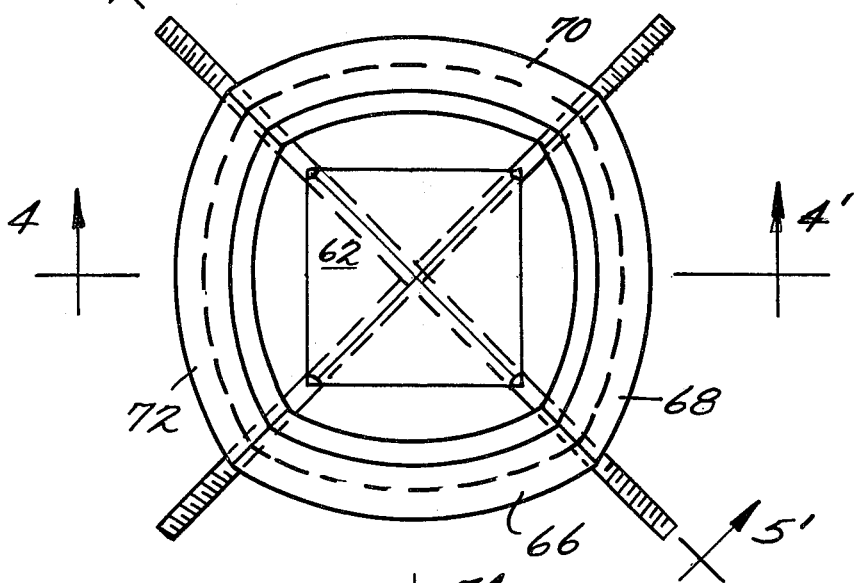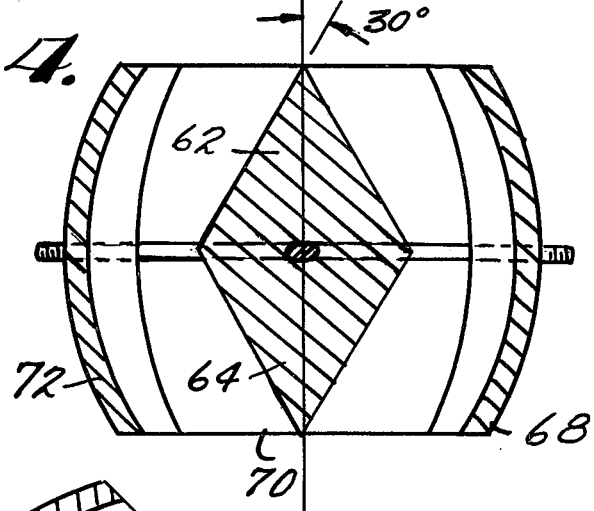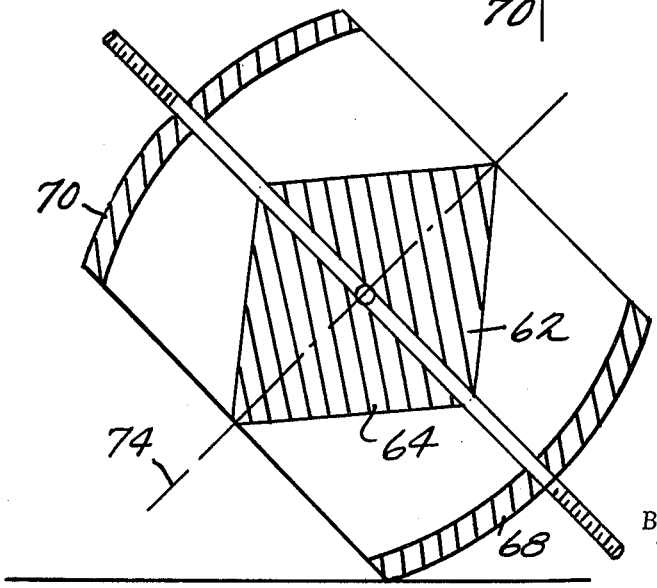

OPTICAL ROTOR FOR COLORIMETRIC ANALYSIS

BRIEF DESCRIPTION OF THE PRIOR ART AND SUMMARY OF THE INVENTION

The invention relates to an optical rotor, particularly for providing a continuously rotating image of an irregular or multicolored material for colorimetric analysis, and to a method of using such a rotor.

Material, such as fabric, must often be analyzed colorimetrically during and after manufacture. Material having an irregular surface, as well as multicolored items, are difficult to so analyze unless the surface can be made to appear uniform to the measuring instrument. One method presently used to minimize this problem is to spin the measured sample at high speed, thereby providing an average color signal to the instrument. While this approach is satisfactory for small samples, the difficulties of spinning a large sample, such as a carpet, are obvious. Often it is undesirable to remove swatches from the sample.

The present invention relates to a method and apparatus whereby an image of the sample is formed and rotated by an image rotor to provide an average color signal rather than physically rotating the sample.

In one embodiment described below, the rotor comprises two pyramid-shaped mirrors with their bases mating and a plurality of concave mirrors with their concave surfaces facing the pyramid-shaped mirrors so as to define first and second apertures with the peaks of the two pyramid-shaped mirrors extending toward the apertures. When a light beam of an image enters one of the apertures and is incident upon one of the sides of one of the pyramid-shaped mirrors, the angle of incidence, and hence the angle of reflection, is a function of the position of the pyramid-shaped mirror. The reflected image is reflected again by the concave-shaped mirrors to the other aperture so that a reconstructed image is produced at the other aperture, rotated with respect to the incident image. The reconstructed image can thus be continuously rotated by continuously rotating the pyramid-shaped mirrors about an axis which passes through their peaks and bases.

In another embodiment described below, the rotor comprises two 6 sided prisms with two pairs of opposing parallel sides and two opposing sides which are inclined. The prisms are, each preferably mounted with their bases together, in a housing which defines first and second apertures so that the inclined sides of each face the apertures. The mating prisms thus present flat surfaces to the apertures in the same fashion as the pyramid-shaped mirrors so that the angle of incidence to the surfaces is a function of the angular position of the prisms. Light incident upon the prism is refracted within it and emerges at the other aperture to form an inverted image. By rotating the prisms at a high speed the image is similarly rotated at a high speed.

Many other objects and purposes of the invention will become clear from the following detailed description of the drawings.

BRIEF DESCRIPTION OF THE DRAWINGS

FIG. 3 shows a top view of another optical rotor of this invention;

FIG. 4 shows a cutaway view of the rotor of FIG. 3 along the lines 4–4'; and

FIG. 5 shows a cutaway view of the rotor of FIG. 3 along the lines 5–5'.

DETAILED DESCRIPTION OF THE DRAWINGS

Figure 1:
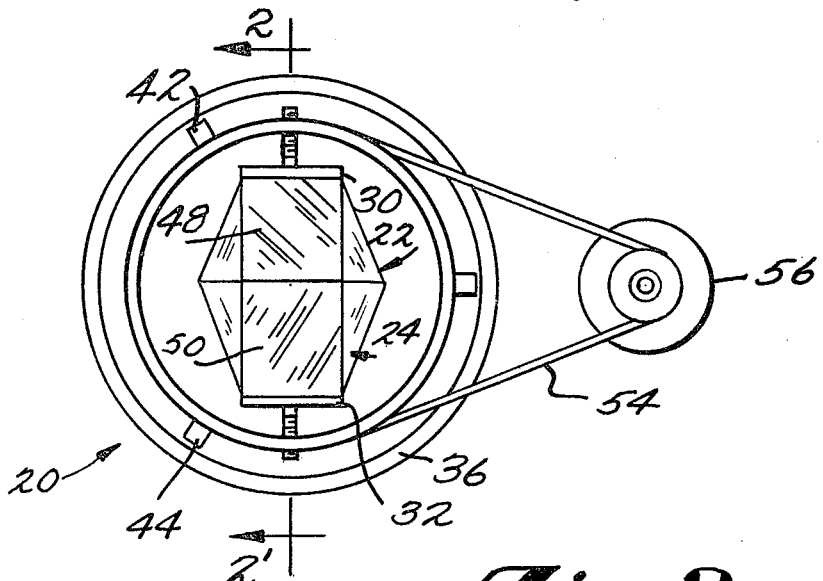
FIG. 1 shows a top view of one embodiment of the optical rotor of this invention.
Figure 2:
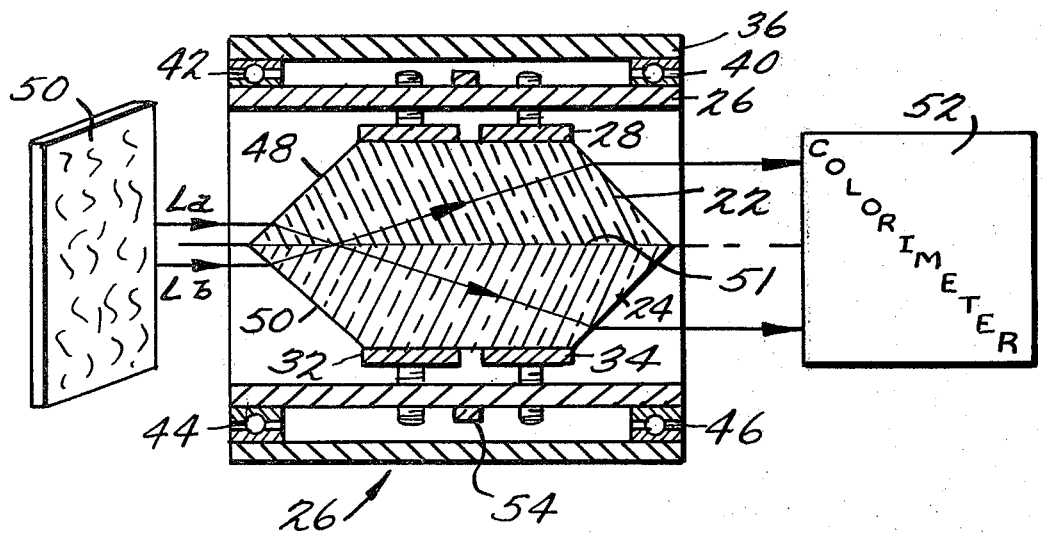
FIG. 2 shows a cutaway view of the rotor of FIG. 1 along the line 2–2'.

Reference is now made to FIGS. 1 and 2 which show respectively a top view of one embodiment of the rotor of this invention and a cutaway view of that same rotor along the lines 2–2'. Rotor 20 includes two prisms 22 and 24 which may be of any suitable material such as glass. Further, prisms 22 and 24, which are substantially identical, are each shaped as a six-sided body with two pairs of opposing parallel sides and two opposing nonparallel sides. The prisms are mated along a parallel side of each as shown with an air gap preferably provided between them. Prisms 22 and 24 are fastened to a cylindrical housing member 26, which may be also of any suitable material such as metal, by means of support members 28, 30, 32 and 34, which attach to the sides opposing the mating sides and which hold the prisms firmly in position during rotation as described below. A further housing member 36 surrounds cylindrical housing member 26 and member 26 is journaled for rotation about housing member 36 with a plurality of bearings, including bearings 40, 42, 44 and 46, provided between them.

Housing member 26 defines two opposing apertures which can each receive an incident image for rotation. Flat opposing nonparallel sides 48 and 50 of prisms 22 and 24, respectively, are inclined with respect to an axis 51 which runs along the bases of prisms 22 and 24 and is also the axis of cylindrical members 26 and 36. Light beams of an image which are incident upon surfaces 48 and 50 enter prisms 22 and 24 and are refracted in the interior, as shown in FIG. 2, before emerging from the opposite surfaces of the prism the beam enter to form an image at the other aperture. Since the angle of incidence of these beams is a function of the angular position of the prisms 22 and 24 about axis 51, the image which appears at the other aperture can be rotated with respect to the incident image by rotating the prisms 22 and 24 about the above mentioned axis 51.

Thus, if a sample of material 50, such as shown in FIG. 2, is disposed so as to present an image to one of the apertures of rotor 20, that image will appear at the other aperture, rotated in accordance with the angular position of prisms 22 and 24 about the above mentioned axis 51. Similarly, if the prisms 22 and 24 are continuously rotated about axis 51, the image which appears at the other aperture will also continuously rotate. Thus, if the sample 50 is irregular or is multicolored, the rotating image which appears at the other aperture will provide an average color signal which can be received and properly interpreted by colorimeter 52. In the arrangement shown in FIGS. 1 and 2, the prisms, together with member 26, are rotated by means of a conventional belt 54 which connects to a conventional electric motor 56, but it will be appreciated that any suitable way of rotating the prisms at a high speed can be employed.

FIGS. 3 to 5 show a further embodiment of the rotator. In this arrangement two aluminized mirrors 62 and 64 are mounted with their bases mating and are surrounded by four concave spherical mirrors 66, 68, 70 and 72 which define two apertures, one for receiving an image and the other for providing a rotated image. The bases of the pyramid-shaped mirrors 62 and 64 are provided with grooves which extend from the corners of the mirrors to the center of the pyramid base and four support rods are disposed in these grooves and extend to the exterior of the device between the concave mirrors 66, 68, 70 and 72 which are also grooved to pass the pyramid-assembly support rods. These rods permit the pyramid-shaped mirrors to be exactly positioned and aligned with respect to each other.

As in the other embodiment described above, the angle of incidence of light beams of an image which strike the surfaces of pyramids 62 and 64 which face the aperture receiving the image varies as a function of the angular position of mirrors 62 and 64 about axis 74 which, as can be seen, passes through the peaks of the two pyramids and through their bases as well. The light reflected from these surfaces is further reflected from the concave mirrors 66, 68, 70 and 72 so as to form at the other aperture a reconstructed image which is rotated with respect to the incident image an angle which is a function of the angular position of the mirrors 62 and 64. Accordingly, by rotating at a high speed mirrors 62 and 64, and, if desired, the concave mirrors 66, 68, 70 and 72, the image of a material having an irregular or multicolored surface which appears at the other aperture also rotates and thus presents the appearance of a uniform color to a colorimeter or the like which is positioned adjacent the other aperture for receiving the rotating image. As in the other embodiment, any suitable arrangement for rotating the device can be employed.

The mirrors 62 and 64 are preferably aluminized and in one embodiment were made having bases 2-¼ inches on a side. The sides of the pyramids in that embodiment were made to make an angle of 30° with respect to the assembly, the concave mirrors were made to have a focal length of 43 millimeters, and with these dimensions the assembly had a length of roughly 99 millimeters. No interference or other coatings need to be used on the objects, but it is desirable to protect the aluminum coatings on the mirrors if possible, and particularly it is desirable that the edges of the pyramids remain unbroken. The use of the concave mirrors to gather the light is believed to be somewhat more optically efficient than the prism arrangement shown in FIGS. 1 and 2.

Many changes and modifications in the above embodiments of the invention can, of course, be made without departing from the scope of this invention, and, accordingly, that scope is intended to be limited only by the scope of the appended claims.

What is claimed is:

1. An optical rotor comprising:
   a first mirror shaped as a pyramid having a plurality of sides and a base,
   a second mirror shaped as a pyramid having a plurality of sides and a base with the base of said second mirror mating with the base of said first mirror so that light beams of an image incident upon one of the sides of one of said mirrors is reflected at an angle with respect to a fixed plane which varies with the angular position of said mirrors about an axis through said bases of said mirrors,
   a plurality of concave mirrors, and
   means for mounting said concave mirrors with their concave surfaces facing said pyramid-shaped mirrors so as to define first and second apertures for receiving an image and transmitting a rotated image and so that beams of an image entering said first aperture, incident upon one of the sides of one of said pyramid-shaped mirrors, and reflected from that side are further reflected to said second aperture to form a rotated image which has an angular rotation which varies with the angular position of said pyramid-shaped mirrors about said axis.

2. A rotor as in claim 1 wherein the number of said sides is four and the number of said mirrors is four.

3. A rotor as in claim 1 including means for continuously rotating said pyramid-shaped mirrors.

4. A rotor as in claim 1 further including a means for receiving the rotated image and analyzing the color components thereof.

5. A rotor as in claim 1 wherein said each of said mirror has grooves extending on its base from the corners of the pyramid to the center of the base and said mounting means includes four support rods extending in said grooves from the exterior to the center of the bases of said mirrors.

* * * * *